(12) United States Patent
Bradley

(10) Patent No.: US 9,683,628 B2
(45) Date of Patent: Jun. 20, 2017

(54) VIBRATION DAMPING IN ROTOR ASSEMBLY

(75) Inventor: Stuart Ian Bradley, Leicester (GB)

(73) Assignee: GE Energy Power Conversion Technology LTD (GB)

( * ) Notice: Subject to any disclaimer, the term of this patent is extended or adjusted under 35 U.S.C. 154(b) by 523 days.

(21) Appl. No.: 13/696,313

(22) PCT Filed: Apr. 26, 2011

(86) PCT No.: PCT/EP2011/002082
§ 371 (c)(1),
(2), (4) Date: Nov. 6, 2012

(87) PCT Pub. No.: WO2011/141126
PCT Pub. Date: Nov. 17, 2011

(65) Prior Publication Data
US 2013/0057092 A1    Mar. 7, 2013

(30) Foreign Application Priority Data

May 11, 2010   (EP) .................................... 10004954

(51) Int. Cl.
*H02K 1/28* (2006.01)
*F16F 15/14* (2006.01)

(52) U.S. Cl.
CPC ............................. *F16F 15/1414* (2013.01)

(58) Field of Classification Search
CPC .. H02K 1/28; H02K 7/14; H02K 7/16; H02K 9/06
USPC ................................................ 310/51, 62, 63
See application file for complete search history.

(56) References Cited

U.S. PATENT DOCUMENTS

| | | | | |
|---|---|---|---|---|
| 4,734,600 A | * | 3/1988 | Bergan | H02K 9/06 310/51 |
| 5,306,123 A | * | 4/1994 | Day et al. | 310/51 |
| 5,485,053 A | * | 1/1996 | Baz | 310/326 |
| 5,966,996 A | | 10/1999 | Hamaekers | |
| 6,144,131 A | * | 11/2000 | Hollenbeck et al. | 310/51 |
| 7,709,991 B2 | * | 5/2010 | Ionel et al. | 310/43 |

FOREIGN PATENT DOCUMENTS

| | | |
|---|---|---|
| DE | 4430036 C1 | 8/1995 |
| EP | 0466540 A1 | 1/1992 |
| EP | 1624549 A2 | 2/2006 |
| FR | 2608709 A3 | 6/1988 |
| GB | 2153484 A  *  8/1985 ............. F16F 15/10 |

* cited by examiner

*Primary Examiner* — Michael Andrews
(74) *Attorney, Agent, or Firm* — Wood IP LLC

(57) ABSTRACT

The present invention relates a rotor assembly for an electrical machine (e.g. motor or generator) where a tuned vibration absorber adapted to provide radial damping is mounted directly to the rotor shaft.

8 Claims, 4 Drawing Sheets

VIBRATION DAMPING IN ROTOR ASSEMBLY

FIELD OF THE INVENTION

The invention relates to rotors for rotating electrical machines such as motors and generators.

BACKGROUND OF THE INVENTION

The rotor shaft of an electrical machine is subject to bending during rotation. The critical speed of the rotor shaft (sometimes called its natural frequency) is the rotational speed at which the rotor shaft becomes dynamically unstable and where it is likely to experience significant structural resonances which may cause noise, vibration, fatigue stresses and other undesirable effects. For any particular rotor shaft there are a large number of critical speeds but often only the first (lowest) and sometimes the second (next lowest) will be of concern. The remaining critical speeds will normally be so high as to be outside the operating speed range of the electrical machine.

Electrical machines may have critical speeds that limit their operating speed range. This can be a particular problem for variable speed electrical machines and especially those that have a high operating speed where to reach that operating speed a critical speed must be passed. The critical speed is typically proportional to the stiffness and mass distribution of the rotor shaft and supporting bearing. It can be difficult to avoid critical speeds because there are often constraints on the design of the electrical machine such as the type of supporting bearing that must be used, the position of the supporting bearing, and the rotor shaft materials.

Existing solutions to the problem of critical speed are directed to providing an improved dynamic response for the supporting bearings and structures.

SUMMARY OF THE INVENTION

The present invention involves integrating a tuned vibration absorber (TVA) within a rotating electrical machine to provide vibration damping in the radial (or bending) direction and control the critical speed of the rotor. More particularly, the present invention provides a rotor assembly for a rotating electrical machine comprising a rotatable shaft and a TVA mounted to the rotatable shaft.

The rotor assembly may include a plurality of TVAs, for example mounted to the rotatable shaft at axially spaced locations. It will be readily appreciated that the rotatable shaft will normally be much more flexible than the rotor body or core. Mounting the damper mass directly on the rotatable shaft means that the damper mass can be relatively small and is particularly important in rotor assemblies where the difference between rotor body and shaft stiffness becomes large.

The TVA preferably includes a rigid mass that is supported by a spring and damper mechanism. The damper mass is not connected directly to the rotatable shaft but only by means of the spring and damper mechanism. The spring rate of a spring assembly and the mass of the damper mass are preferably chosen to match a natural frequency of the rotatable shaft. Typically this will be the lowest natural frequency of the rotatable shaft and hence the first critical speed. The damping constant of the damper is preferably chosen to restrict the response magnitude of the rotatable shaft to a desired level.

The TVA will normally provide two critical speeds in place of the critical speed that it is designed to match. The structural resonances at these critical speeds will normally be lower because of the damping effect provided by the TVA but this will depend on the damping. In general terms the structural resonances or vibration magnitude at a critical speed is proportional to the damping level if all other parameters of the TVA and the rotatable shaft are kept constant. Providing two separate critical speeds can either be used to achieve a damped response with lower structural resonances or vibration magnitude at the new critical speeds; to allow the rotating electrical machine to have a wider operating speed range (e.g. by providing new critical speeds outside the normal operating speed range); and/or achieve very sharp resonant peaks at the new critical speeds by providing minimal damping so that there is only a very narrow operating speed range that cannot be used.

The TVA may take the form of a substantially annular rigid mass that is supported by a spring assembly and a damper of viscoelastic material that is shaped and arranged to provide both radial and axial stability. The substantially annular rigid mass could be part of an air-cooling fan for the rotor, a balance ring or any other rotatable structure, for example. If the annular mass of the TVA is an air-cooling fan then this would give a positive axial load such that, with appropriate design, the fan/damper mass can be stabilised more easily than some other types of mass, which at higher speeds may become unstable due to unbalance or gyroscopic effects.

The viscoelastic material preferably has a relatively high damping constant to reduce as much as possible the structural resonances that occur when the rotational speed of the rotor shaft matches the two critical speeds. The viscoelastic material may be a suitable polymer or plastics material. Viscoelastic materials can allow greater flexibility in the design of the rotor assembly and can dissipate more vibration energy than using rubber blocks, for example, which will melt if run at resonance for a long time. The separation between the spring assembly and the damper also means that spring rates and system stability can be optimised without compromising the radial damping effects—giving benefits like high damping in one direction only hence cutting down on unwanted energy losses.

The spring assembly may include a plurality of circumferentially-spaced discrete springs (e.g. arranged around the radially inner circumference of the rigid mass) to provide the required stiffness in the radial direction, and optionally also in the axial and/or torsional direction. The spring assembly may also be provided in the form of a substantially continuous spring member having a shaped rubber section to give the spring member the desired stiffness in the radial direction, for example. More than one spring assembly may be provided between the rotatable shaft and the damper mass, for example at axially spaced locations.

The rotor assembly provides a rotating magnetic field and this can be generated by permanent magnets, superconducting windings with a suitable excitation power supply or conventional windings with slip rings or brushless excitation power supply, for example.

The rotor assembly is preferably mounted for rotation relative to a stator assembly. A stator winding may be received in slots provided in a surface of the stator assembly in a conventional manner.

BRIEF DESCRIPTION OF THE DRAWINGS

Exemplary embodiments of the invention will now be described, with reference to the accompanying drawings, in which.

DETAILED DESCRIPTION OF THE PREFERRED EMBODIMENTS

Figure 1:
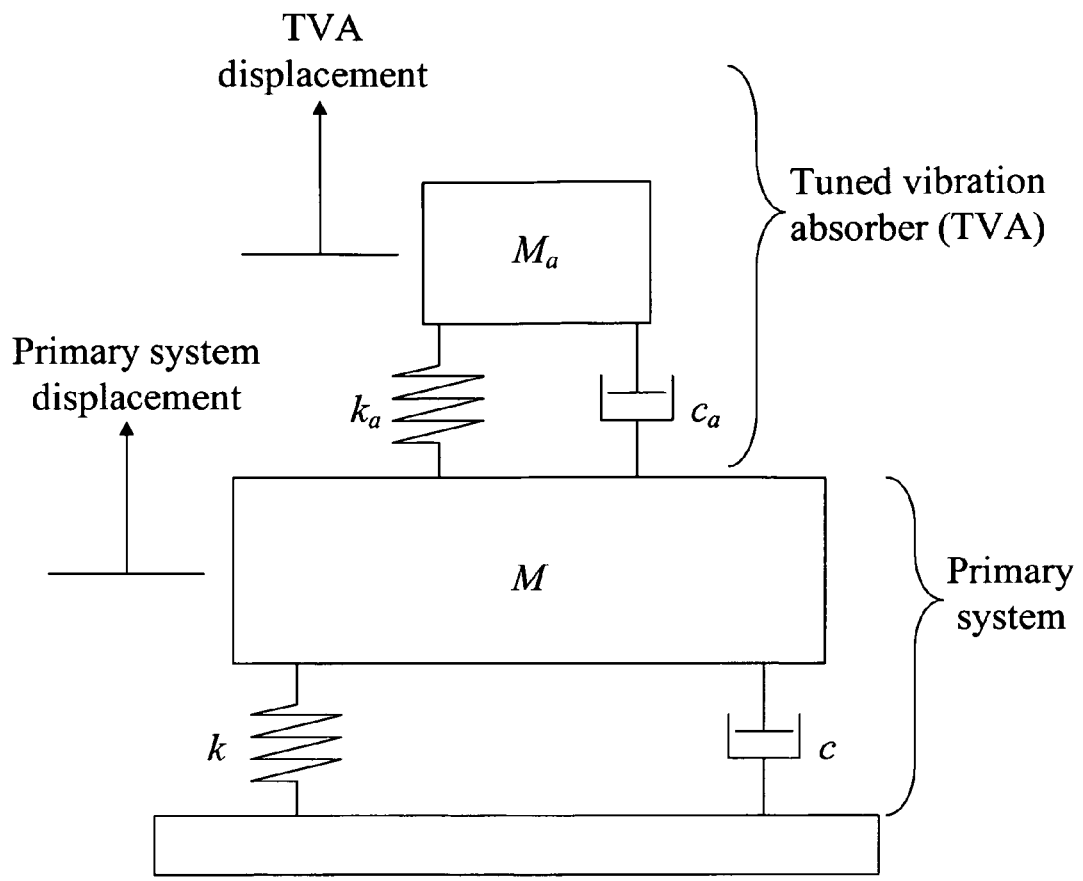
FIG. 1 is a schematic drawing showing a tuned vibration absorber.

With reference to FIG. 1 a rotating primary system consists of a rigid mass (having mass M) supported by a spring and damper mechanism having a spring rate k and which provides damping c. The primary system has a first (lowest) critical speed. A tuned vibration absorber (TVA) for radial damping consists of a smaller rigid mass (having mass $M_a$) mounted to the rigid mass of the primary system by a spring and damper mechanism having a spring rate $k_a$ and which provides damping $c_a$. The spring rate $k_a$ and the mass $M_a$ of the TVA are chosen to match the first critical speed of the primary system. Damping $c_a$ is provided to restrict the response magnitude or displacement at critical speeds. The effect of the TVA is to replace the critical speed of the primary system with two separate critical speeds. Typically the structural resonances at those critical speeds are of a lower magnitude but this does not have to be the case.

Figure 2:
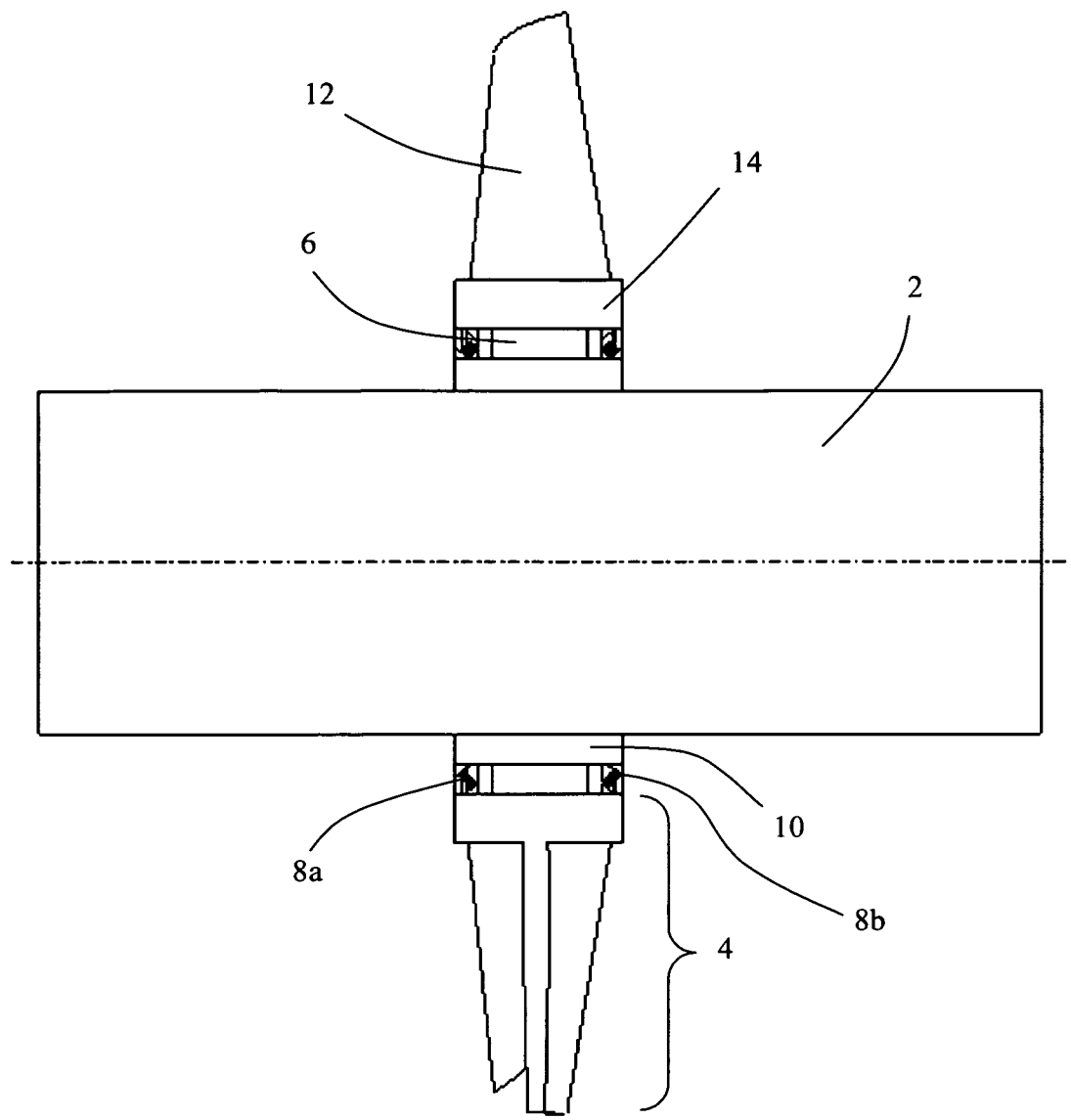
FIG. 2 is a cross sectional view showing a rotor assembly according to the present invention.
Figure 3:
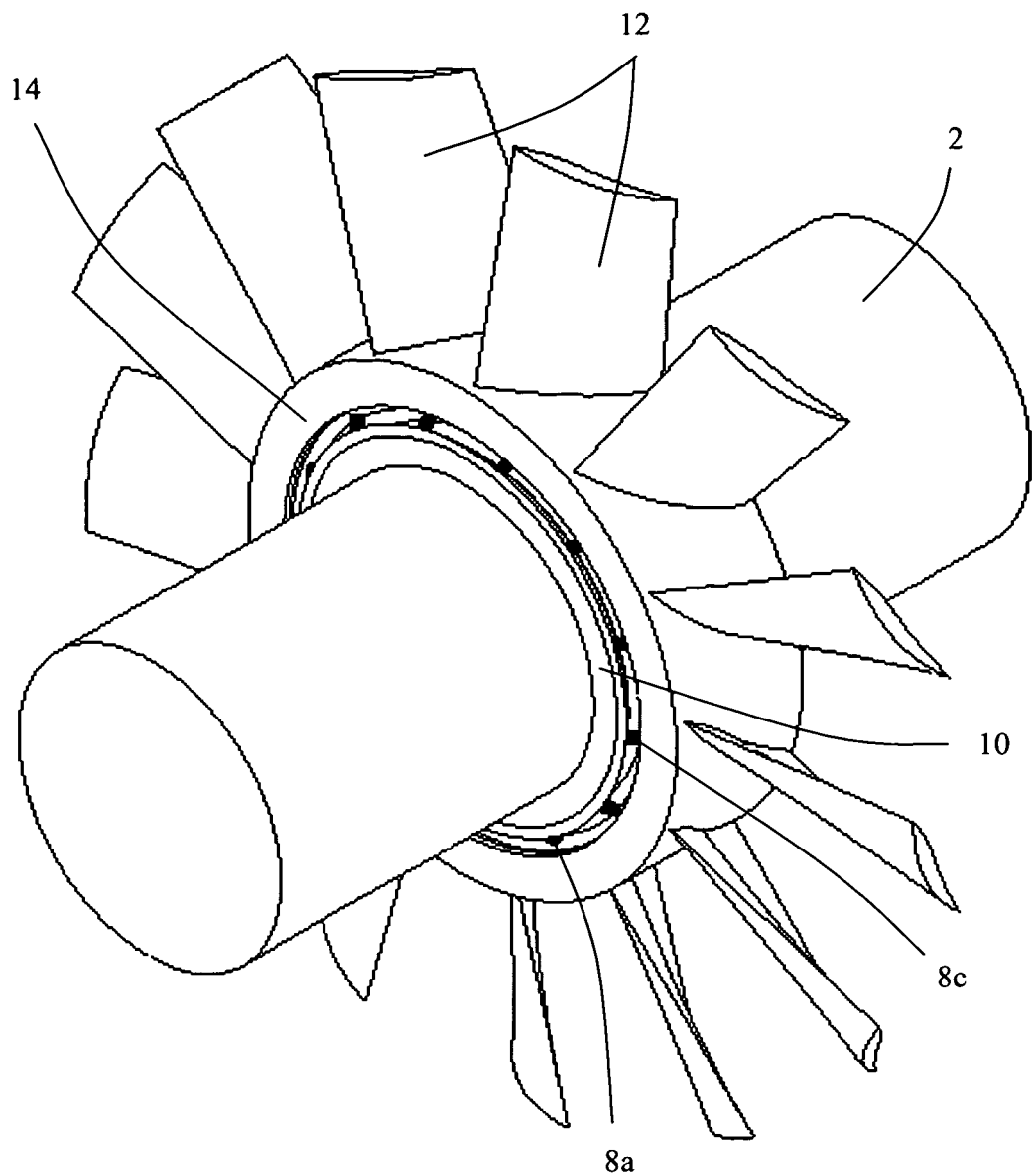
FIG. 3 is a perspective view of the rotor assembly of FIG. 2.

FIGS. 2 and 3 show how a TVA can be implemented practically for use with a rotor shaft 2 of a rotating electrical machine (e.g. a motor or generator). The TVA consists of an annular mass 4 supported by a layer of viscoelastic material 6, which acts as a damper, and axially spaced spring assemblies 8a, 8b. Together the spring assemblies 8a, 8b and the viscoelastic material layer 6 form the spring and damper arrangement that is shown schematically in FIG. 1. The annular mass 4 is not connected directly to the rotor shaft 2 but is connected to it indirectly by means of the spring assemblies 8a, 8b and the viscoelastic material layer 6.

Each spring assembly includes a plurality of discrete springs 8c arranged around the radially inner circumference of the annular mass 4 to provide the required axial, torsional and radial stiffnesses. The springs 8c are preferably of a fail-safe design so that the annular mass 4 remains secured to the rotor shaft 2 under all conditions. The spring assemblies 8a, 8b give good stability against axial forces but have the correct stiffness in the radial direction to enable the TVA to match the first critical speed of the rotor shaft 2.

The viscoelastic material layer 6 has a relatively high damping characteristic $c_a$ to provide resonance control at the two separate critical speeds. The viscoelastic material can be a polymer or a plastics material. The viscoelastic material layer 6 can be shaped and positioned to provide radial and axial stability in addition to its damping effect. The mass $M_a$ of the annular mass 4 and the spring rates $k_a$ of the springs 8 are chosen according to the mass M of the rotor shaft 2 (and optionally also the mass of the supporting bearings and structures which are not shown) to match the first critical speed of the rotor shaft.

The annular mass 4 forms part of a rotor air-cooling fan and a plurality of fan blades 12 are integrally mounted to it. The springs 8c and the viscoelastic material layer 6 are fixedly secured to an annular flange part 10 of the rotor shaft and to a radially inner surface of an annular root part 14 of the annular mass 4 to which the fan blades 12 are integrally mounted.

In a working example the rotor shaft shown in FIGS. 2 and 3 can be used as part of a high-speed motor with an operating speed range of 0 to 6600 rpm. A conventional rotor shaft for the same motor would have a first critical speed of about 3100 rpm. The addition of TVAs each with a mass ($M_a$) of 57 kg at two axially spaced rotor air-cooling fan positions provides a reduction in structural resonance vibrations of 99.97% at a rotational speed of about 3100 rpm. Two new critical speeds are created at about 2600 rpm and about 3700 rpm but the structural resonances at those critical speeds have a magnitude lower than that for the conventional rotor shaft. The addition of two axially spaced TVAs means that the rotor shaft can meet American Petroluem Institute (API) vibration standards without the need for a more complicated rotor construction.

Figure 4:
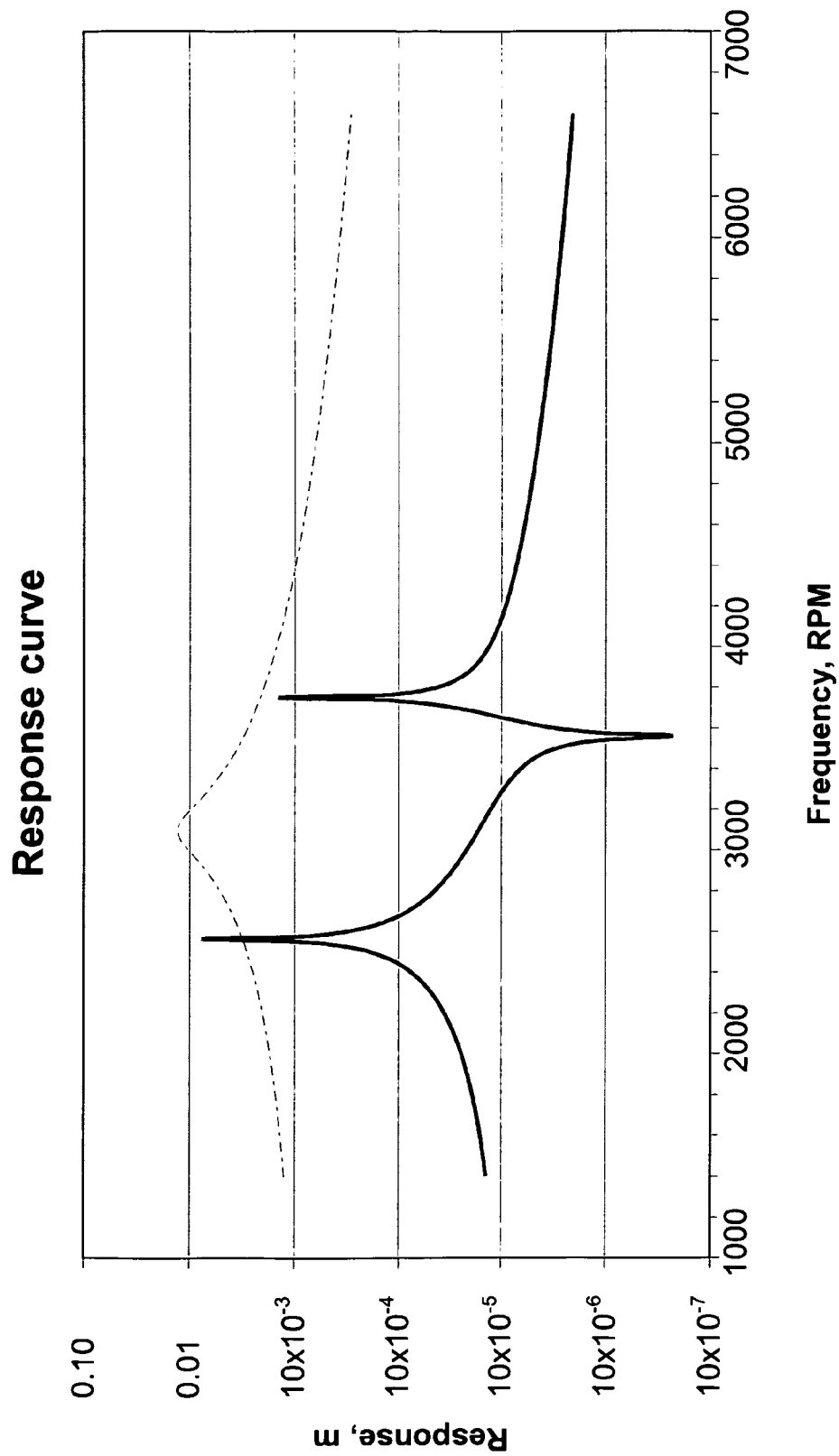
FIG. 4 is a graph showing response magnitude versus operating speed for a rotor assembly according to the present invention that incorporates a tuned vibration absorber. A comparison graph shows the response magnitude versus operating speed for an identical rotor assembly without a tuned vibration absorber.

The vibration magnitude versus operating speed for the conventional rotor shaft (i.e. the rotor shaft without TVAs) is represented in FIG. 4 by the dashed line. It shows a maximum vibration magnitude at the first critical speed of about 3100 rpm. The vibration magnitude versus operating speed for the rotor shaft that incorporates the TVA is represented in FIG. 4 by the solid line. It shows maximum vibration magnitudes at the critical speeds of about 2600 rpm and about 3700 rpm.

The benefits of integrating a TVA within a rotating electrical machine to provide vibration damping and control the critical speed(s) of the rotor provides the following technical benefits:

Vibration levels are reduced over all operating speed ranges

Fatigue stresses are reduced

There are no limits to operating speed

Stiff and massive rotors are not required leading to reductions in weight and cost Cheaper materials can be used The TVA can be retrofit to existing rotor designs The TVA does not require a control system, lubrication or renewable components

What is claimed is:

1. A rotor assembly for an electrical machine comprising: a rotatable shaft; and
a tuned vibration absorber configured to provide radial damping to the rotatable shaft, the tuned vibration absorber being mounted to the rotatable shaft by a mechanism including a rigid mass and a plurality of spring assemblies;
wherein the rigid mass forms part of a fan configured to cool the rotor assembly during operation; and
wherein the plurality of spring assemblies and the tuned vibration absorber are fixedly secured to an annular flange part of the rotatable shaft and radially secured to an inner surface of an annular root part of the rigid mass, and
wherein the annular root part includes a plurality of fan blades mounted thereon.

2. The rotor assembly of claim 1, wherein a damping constant of the mechanism is selected to restrict the response magnitude of the rotatable shaft.

3. The rotor assembly of claim 1, wherein the tuned vibration absorber includes a substantially annular rigid mass.

4. The rotor assembly of claim 3, wherein the spring assemblies are a plurality of circumferentially-spaced discrete springs.

5. The rotor assembly of claim 3, wherein the viscoelastic material is a polymeric material.

6. The rotor assembly of claim 1, further comprising a rotor body.

7. The rotor assembly of claim 1, wherein the tuned vibration absorber is mounted to an annular flange of the rotatable shaft.

8. An electrical machine, comprising:
a stator assembly; and
a rotor assembly including:
   a rotatable shaft;
   a tuned vibration absorber configured to provide radial damping to the rotatable shaft, the tuned vibration absorber being mounted to the rotatable shaft via a mechanism that includes a rigid mass and a spring;
wherein the rigid mass forms part of a fan configured to cool the rotor assembly during operation; and
wherein the spring and the tuned vibration absorber are fixedly secured to an annular flange part of the rotatable shaft and radially secured to an inner surface of an annular root part of the rigid mass, and
wherein the annular root part includes a plurality of fan blades mounted thereon.

\* \* \* \* \*